United States Patent [19]
Gillings et al.

[11] Patent Number: 5,666,490
[45] Date of Patent: Sep. 9, 1997

[54] COMPUTER NETWORK SYSTEM AND METHOD FOR MANAGING DOCUMENTS

[76] Inventors: Dennis Gillings, 113 Waterford Pl., Chapel Hill, N.C. 27514; Joan Mary Lalor, 37 Greenfields, Rosbrien, Limerick, Ireland; Mark Boone Brown, 8325 Greywinds Dr., Raleigh, N.C. 27615; Donna Ann Christiansen, 2821 Isabella Dr., Raleigh, N.C. 27603

[21] Appl. No.: 243,385

[22] Filed: May 16, 1994

[51] Int. Cl.$^6$ ...................................................... G06F 3/00
[52] U.S. Cl. ................. 395/200.68; 395/792; 395/761; 395/800.01; 364/DIG. 1; 705/1; 345/147
[58] Field of Search ...................................... 395/200, 800, 395/600, 144, 145, 146, 147, 150, 200.15; 364/DIG. 1, 225.6, 225.8, 226.1, 401

[56] References Cited

U.S. PATENT DOCUMENTS

| | | | |
|---|---|---|---|
| 4,205,780 | 6/1980 | Buins et al. | 235/454 |
| 4,899,292 | 2/1990 | Montagna et al. | 395/147 |
| 4,959,769 | 9/1990 | Cooper et al. | 395/600 |
| 5,054,096 | 10/1991 | Beizer | 382/41 |
| 5,134,669 | 7/1992 | Keogh et al. | 382/61 |
| 5,168,444 | 12/1992 | Cukor et al. | 364/401 |
| 5,182,705 | 1/1993 | Barr et al. | 364/401 |
| 5,191,525 | 3/1993 | LeBrun et al. | 364/419.1 |
| 5,251,273 | 10/1993 | Betts et al. | 382/57 |
| 5,274,567 | 12/1993 | Kallin et al. | 364/478 |

OTHER PUBLICATIONS

Omni Page Proffessional Window 5., 1988-93, pp. 1-3 to 1-32.

*Primary Examiner*—Alyssa H. Bowler
*Assistant Examiner*—Dzung C. Nguyen
*Attorney, Agent, or Firm*—Rhodes, Coats & Bennett, LLP

[57] ABSTRACT

An electronic document management system converts documents into electronic images which can be sequentially routed to individual users in a network system. The network system includes at least two work nodes for processing the documents where one of the nodes is a data entry work node. The documents are subdivided into two or more subdivisions which are classified by subdivision type. The images are routed through the network system according to predefined routing schemes based on its subdivision type. The routing scheme for the documents includes at least one data entry node where data contained in the document is entered into a database. As the data is entered into the database, it is dynamically linked with its corresponding image which is also stored in the network.

16 Claims, 10 Drawing Sheets

BATCH SCAN

ID

Name

Date

Creator
Index
Status

Pages

Batch Name:

Date:  Operator:

Batch Creation:

Last Scan:

Last Index:

[ NEW ]  [ SELECT ]  [ DELETE ]

Fig.4

BATCH INDEX

HELP

Current Page Indexing Information

Protocol: [ ]   Rcvd Date: [ ]

Doc Type: [ ] [ ]   Visit: [ ]

Site: [ ] [ ]

Page Type: [ ] [ ]   PatID: [ ]

Comment: [ ]

Repeat Information

Multi-Page [ ]   Continuation: [ ]

Version: [ ]   Repeat: [ ]

Batch Information

Batch ID: [ ]   Page: [ ]

Scanner: [ ]   Scan Date: [ ]

[Prev Page] [Next Page] [Annotation] [Save]

Batch Index State

Incomplete  Complete   [ OK ]

Fig.6

EDIT PROCESS

Protocol: ____
Site: ____
Patient: ____

Content
| Item | Pat ID | Visit | Rpt Date |
|---|---|---|---|
|  |  |  |  |

[ Prev ] [ Next ] [ Exit ]

Detail

Visit: ____
File: ____
Repeat: ____
Version: ____
Index Date: ____
Received Date: ____
Entry A Date: ____
Entry B Date: ____
Comments: ____

[ Show DCF ] [ Show Version ] [ Annotation ] [ Tags ]

Edit Status

Incomplete    Complete    [ OK ]

Next Action ____ ☐

Fig. 7

TAGS PROCESSING

Panel Key1 Key2 Key3 Key4 Key5 Key6 Seq

1st TOC

[ Next ]   [ Previous ]   [ Exit ]

Current Tag Information

Field [   ]   Data Item [   ]

Value [   ] [ ]   DCFd By [   ]

Other 1 [   ]   Data DCFd [   ]

Other 2 [   ]   Created By [   ]

Probl Code [   ] [ ]   Data Created [   ]

In-house Comments [   ]

Editor's Comments [   ]

QCRF Association

DCF ID [   ]   CRF ID [   ]

Annotation [   ]   TAG ID [   ]

[ Clear ]   [ Search ]   [ Save ]   [ Cancel ]

FIG. 8

DATA ENTRY PROCESS

Protocol

Site

Patient

Content
Item  Pat ID  Visit  Rpt Date  DCFPage

[Prev] [Next] [Done] [Cancel]

Detail   [Internal]

Visit:

File:

Repeat:

Version:

Index Date:

Received Date:

Entry A Date:

Entry B Date:

Comments:

Entry Status  Incomplete  Complete  [OK]

Fig. 9

COMMENT ENTRY

Content

Item    PatID    Visit    Rpt    Date

| Prev | Next | Exit | Cancel |

Detail

Visit:

File:

Repeat:

Version:

Index Date:

Received:

Entry A Date:

Entry B Date:

Comments:

Comments Complete

| Show DCF | Version | Internal |

| Clarification | DCF |

| Editor | Done | Cancel |

Fig. 10

COMPUTER NETWORK SYSTEM AND METHOD FOR MANAGING DOCUMENTS

FIELD OF THE INVENTION

The present invention relates generally to scientific data management and more particularly to an imaging system for electronically managing case report forms.

BACKGROUND OF THE INVENTION

Before a new drug can be marketed in the United States, clinical research must be conducted to prove the safety and efficacy of the drug. Typically, the safety and efficacy of a new drug is determined by statistical analysis of trial data collected during the clinical research phase of new drug development. The statistical analysis depends on the accuracy of the data being analyzed. Typically, trial data is manually recorded by clinical researchers on case report forms. The data on the case report forms must then be compiled before statistical analysis can be done.

The process of compiling clinical trial data for statistical analysis is paper intensive. A typical study may include thousands of case report forms. The case report forms are distributed among many users for processing the case report forms. In most data management systems, each user performs a specified task and then passes the case report forms to the next user which performs another specified task. The case report forms are passed from one user to another in this manner until processing is complete. One or more of the users enter the data contained in the case report forms into a database maintained on a computer.

The paper intensive processes used for scientific data management in the past were designed to insure the quality and integrity of the scientific database so that a reliable analysis could be made. However, these paper intensive processes have some disadvantages. First, fairly elaborate tracking systems must be created to track the case report forms as they are moved from one user to the next. Normally, a separate tracking database is used to keep track of documents as they are processed. At each step of the process, the tracking database must be updated to reflect the current disposition and location of the document. Maintaining these tracking systems can be time consuming and cumbersome.

Another disadvantage of paper systems is that they are labor intensive. For example, distribution of the case report forms is accomplished by manually moving the case report forms from one user to the next. As a result, support personnel must be hired for handling the case report forms. These support personnel are not directly involved in the data processing.

Another disadvantage of paper systems is that access to a case report form is limited to a single user at a time. That is, only one user at a time possesses the case report form. If another user needs access to the case report form, the other user would have to wait until processing of that case report form is complete, or make a special request to remove the case report form from the processing stream. Removing the case report form from the processing stream increases the complexity of document tracking.

SUMMARY AND OBJECTS OF THE INVENTION

The invention is an electronic document management system particularly designed to manage clinical trial data for pharmaceutical companies. The electronic document management system guarantees the quality and integrity of the scientific database without the inefficiencies inherent in a paper system.

The electronic document management system is implemented in a computer network having a plurality of workflow nodes interconnected by communications media. Predetermined processing functions are performed at each workflow node to process the information contained in the case report forms (CRFs). The case report forms are scanned and converted into electrical images which can be stored in a data storage medium. Generally, each page of a case report form will form a separate image. The images can then be routed through the network to process the case report form. To enable routing of the images, the images are classified by type. A separate routing scheme may be defined for each type of image. The routing scheme defines the sequence of workflow nodes through which each image must pass before the processing of that image is considered complete.

After scanning, each image is assigned a unique identification number and is indexed. The index information is used to track the flow of images within the network during processing. The index information includes a type code used for document routing. After indexing, the document is routed through the network according to the routing scheme defined for the corresponding type. In each case, the routing scheme will include a data-entry node where data contained in the image is entered into a database. The database includes a key field for linking each database record with the image which is the source of the data. As each image is processed at the data-entry node, the identification number is automatically entered into a key field of the database record to create a permanent link between the database record and its source image. Linking the database record with its source image enables the image to be subsequently retrieved directly from the database.

The processing of a document in the scientific data management system is divided into the following functions: document scanning, document indexing, comment entry, clinical review, regulatory review, editing, data entry, and ad hoc retrieval.

Incoming documents are normally scanned as they are received and converted to electrical format. The scanned documents are assigned to a batch. After scanning, the batch is routed to document indexing to enable tracking of the documents. Document indexing is the process of associating identifying information with each image. Once a document has been indexed, tracking information is automatically maintained in a tracking database as documents move through the system. The indexing process eliminates the need for separate tracking systems.

After indexing, documents requiring clinical review or regulatory review are routed respectively to a clinical review queue or a regulatory review queue. All other documents are routed to an editing queue for editing. When the clinical and regulatory review process is complete, the documents are then routed to the editing queue.

The actions performed at the editing station include new document processing prior to release to data entry, and data entry review. New document processing involves reviewing documents for completeness and clarity. Annotations are added to the document when necessary for clarification. Data entry review involves reviewing issues that arise during data entry.

Edited documents are passed to the data-entry work queue for entry into the database. If any "hot keys" are generated during data entry, the associated documents are routed back to the editing work queue for review. The editor reviews "hot keys" inserted during data entry, and if necessary, generates data clarification forms (DCFs). All data is double-keyed by two separate data-entry operators. After the first data-entry operator has committed his or her entries, the document is routed to the second data-entry operator unless a "hot key" was generated during data entry. If a "hot key" is generated during the first stage of the data entry, the document is routed back to the editing station for review, and then to the second data-entry operator after the review is complete. If the second data-entry operator generates "hot keys" during data entry, the document is again routed back to the editing station for review. If no "hot keys" were generated during the second stage of the data entry, the documents are routed to comment entry where comments can be entered into a comment database.

Based on the foregoing, it is a primary object of the present invention to provide an electronic document managing system for electronically managing case report forms without the inefficiencies inherent in a paper system.

Another object of the present invention is to provide an electronic document managing system wherein paper documents are converted to electronic images which can be individually routed within the network.

Still, another object of the present invention is to provide an electronic data management system which automatically tracks each image as it is routed through the network without the need for a separate tracking database.

Yet another object of the present invention is to provide an electronic data management system which allows subdivision of documents into a plurality of discreet images which can be independently routed through the network.

Another object of the present invention is to provide an electronic data management system which automatically links each record in the scientific database with a corresponding image or images.

Still another object of the present invention is to provide an electronic data management system which allows each image to be viewed simultaneously by multiple users.

Other objects and advantages of the present invention will become apparent and obvious from a study of the following description and the accompanying drawings which are merely illustrative of such invention.

BRIEF DESCRIPTION OF THE DRAWINGS

FIG. 4 is a drawing of a dialog box for selecting a batch during scanning or indexing.

FIG. 6 is a drawing of the process screen used during the indexing process.

FIG. 7 is a drawing of the process screen used during the edit process.

FIG. 8 is a drawing of the screen used for TAGS processing.

FIG. 9 is a drawing of the process screen used during the data-entry process.

FIG. 10 is a drawing of the process screen used during the comment entry process.

DETAILED DESCRIPTION OF THE INVENTION

The invention is a computer-implemented, scientific data management system particularly designed to manage clinical trial data for pharmaceutical companies. Documents containing clinical trial data are scanned and converted to an electrical format. After scanning, the documents are indexed to enable tracking of the documents. The index information may comprise a combination of system-defined and user-defined index fields. After indexing, the images are routed in a predefined sequence to system users. Each image is classified by type. For each image type, a separate routing scheme can be defined. Thus, each page of a document can be routed independently from the other pages of the same document. The documents, are edited and data contained therein is entered into a scientific database. When the data is entered, a link is dynamically established between the database record and the image which is the source of the data.

Figure 1:
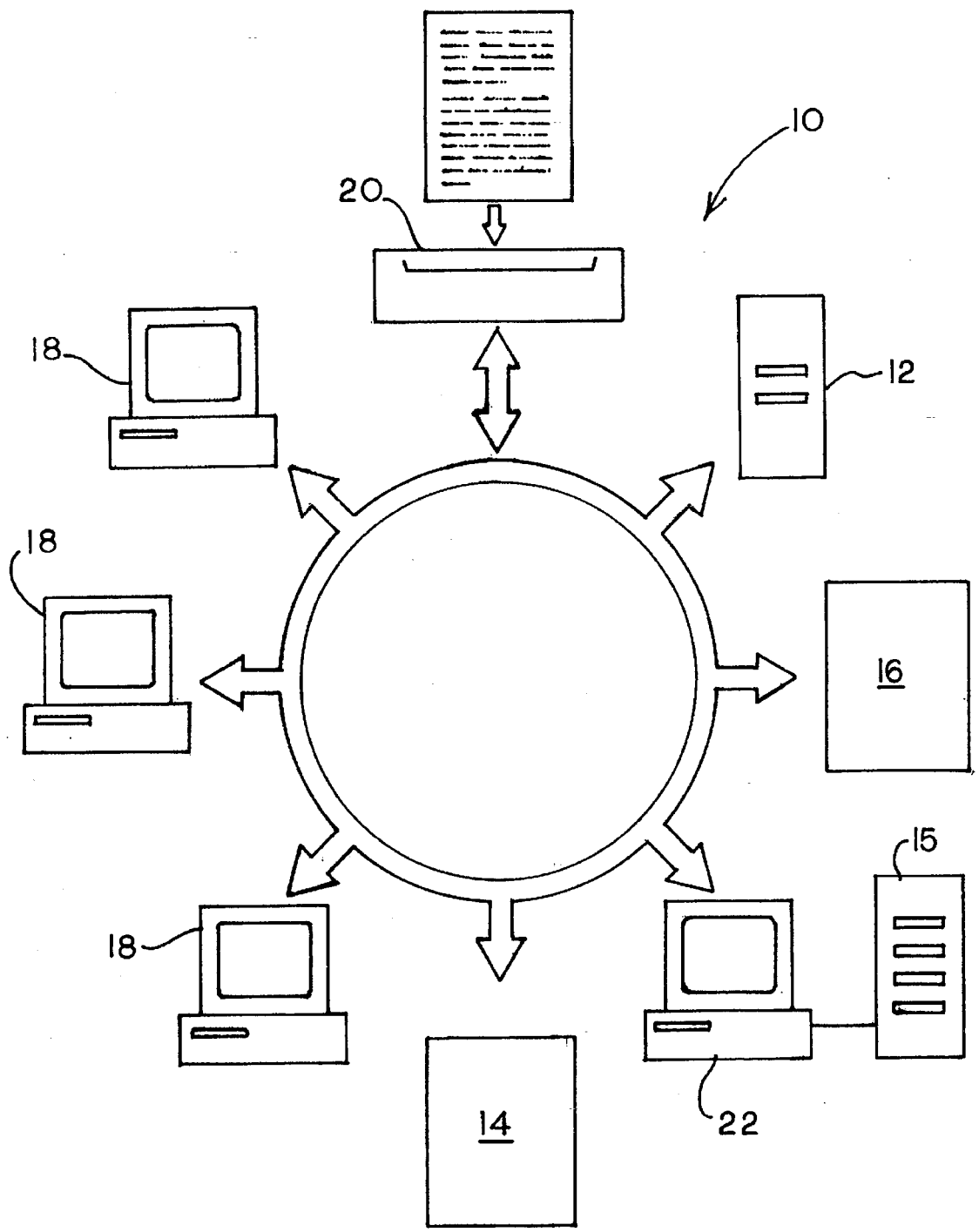
FIG. 1 is a schematic diagram of the network system for implementing the document management system.

Referring now to FIG. 1, a schematic diagram of the computer network system is shown. The network system is indicated generally by the numeral 10. The network system 10 includes a database server 12, one or more data storage units 14, a workflow server 16, a plurality of user stations 18, and one or more scanning stations 20.

The database server 12 is a mini-computer which serves most database functions. The database server handles the storage and retrieval of data in the scientific database management system. All requests for data are made via the database server.

The data storage unit 14 is a memory device in which data can be stored in an electrical format. The data storage unit 14 may comprise either magnetic disks, optical disks, or any other storage medium commonly used in the computer industry. In the present system, separate image storage units 15 are used as the primary medium for the storage of images. The image storage units 15 comprise one or more optical disks which are preferably isolated in a separate segment on the network using a file server 22 to handle requests for images. The file server 22 should be the only node on the network that directly communicates with the image storage unit 15. The file server 22 may contain a magnetic disk which serves as a cache or temporary storage medium for frequently requested images.

The workflow server 16 manages the workflow functions for the system. The workflow server 16 handles document and folder distribution, processes alerts, updates workflow queues, and routes all images within the network. The workflow server 16 tracks all images in process and updates the database with the status and current location of each image.

The user work stations 18 are personal computers where the major data processing functions are performed. Each work station 18 includes a display for displaying scanned images and input means such as a computer keyboard. The scanning station 20 is a specialized work station connected to a scanner for scanning documents and converting the documents to an electrical format.

The scientific data management system enables large volumes of documents to be electronically managed thereby eliminating the need for handling paper documents. The process is implemented by computer software running on network resources.

I. Process Fundamentals

Protocols, Case Report Forms (CRF), And CRF Packets

The scientific data management (SDM) system of the present invention is specifically designed to handle documents and data relating to clinical testing of pharmaceutical and biomedical products. A protocol is the highest level entity in the data management system. Generally, a protocol corresponds to a single clinical trial or study. For example, a clinical trial of a new drug involves administering the new drug to a human population and then monitoring the patients and collecting data. The patients will normally visit an investigator, which is usually a doctor or other medical professional, on one or more occasions. During each visit, the investigator examines the patient and records his findings on a written document called a case report form (CRF). For each visit, a CRF is completed by the investigator. A different CRF may be used for each visit, or a single CRF may be used for more than one visit. The data management system of the present invention is used to manage CRF's associated with a clinical trial, to process data contained in the CRFs, and to analyze the data collected.

When a new protocol is started in the data management system, a CRF packet for the protocol is defined. A CRF packet describes each CRF page which is expected in connection with a given protocol. That is, a CRF packet describes a complete set of CRF pages used for a single patient over the course of a study. As previously indicated, each study may include more than one kind of CRF page, multiple copies of the same CRF page, or a combination of the two. The CRF packet describes each page of each CRF which is expected to be received during the course of the study. The system uses the CRF packet to validate documents when they are received and for quality control.

User Desktop

Figure 3:
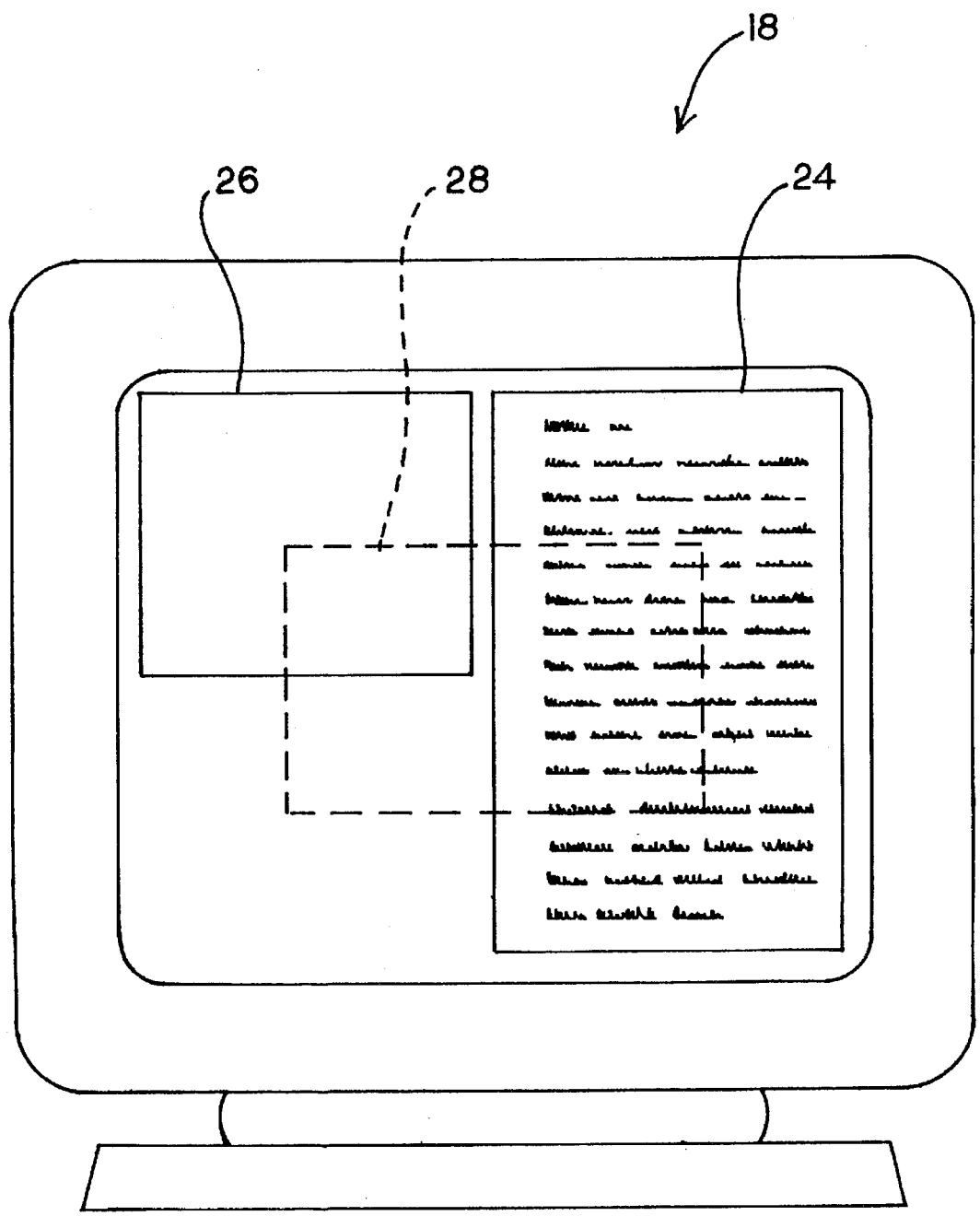
FIG. 3 is a drawing of a display showing the major components of the user interface.
Figure 5:
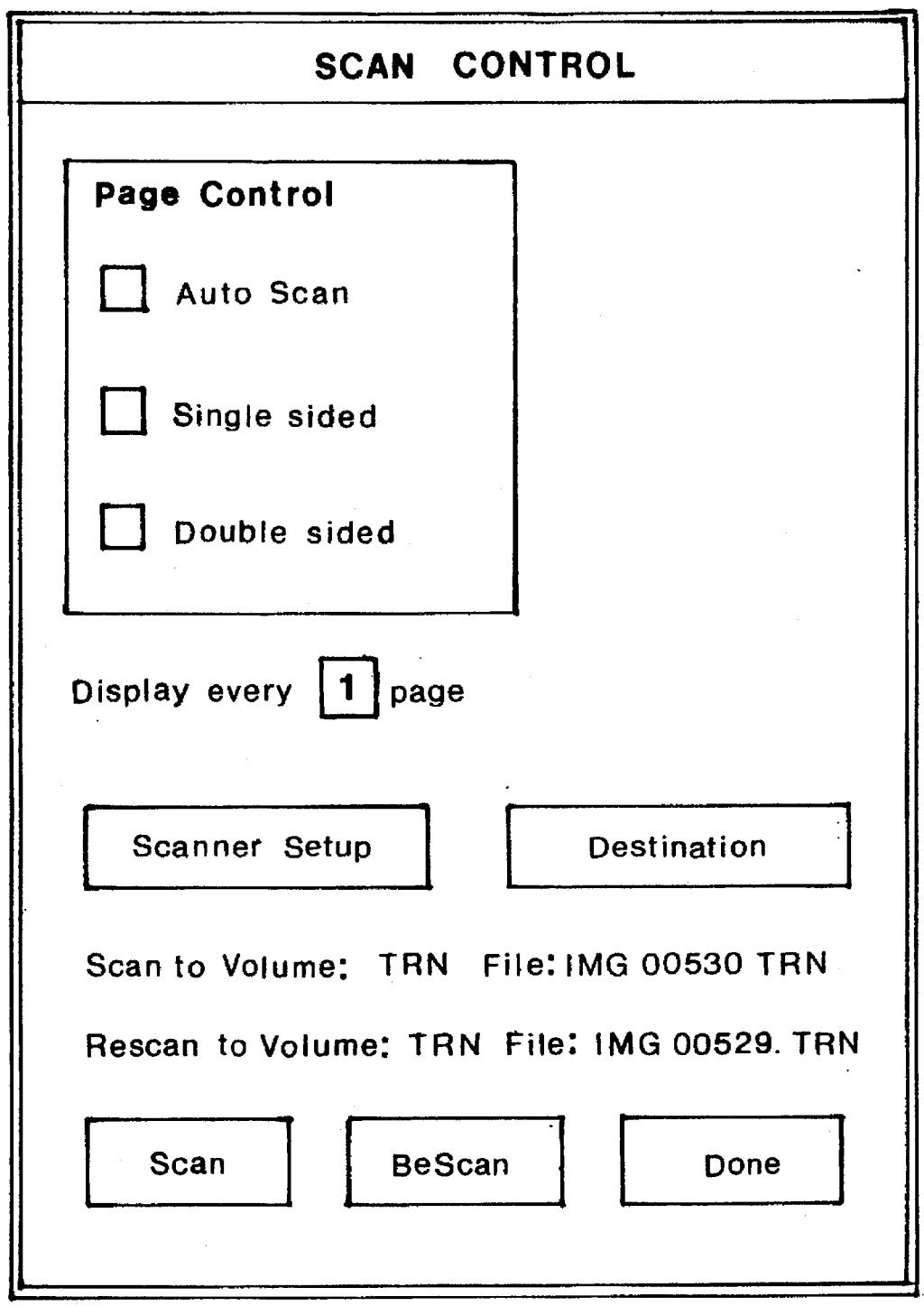
FIG. 5 is a drawing of the process screen used during the scanning process.

Each system user operates at his/her user workstation 18. While each user's interface within the SDM system may differ, each interface has certain common components. As shown in FIG. 3, each user interface includes a document window 24, and a process screen 26. Additionally, dialog boxes 28 are used to prompt the user for information.

A program referred to herein as the document manager manipulates the images scanned into the SDM system. The document manager groups images into documents and keeps pages in the proper sequence. The images are displayed in a window called the document window 24. The document manager allows the user to zoom, pan, rotate, invert, and tile images.

The process screen 26 is closely coupled to the document window. The process screen 26 contains all the controls required to perform certain operations in the processing of CRF pages. Each process screen 26 contains list boxes, entry boxes, entry fields, buttons, and other controls required for a specific task.

The process screen is launched from a workflow queue. A workflow queue is a list of documents requiring further processing. The user selects documents from the workflow queue. Ordinarily, a group of documents is selected at a time. After the selection is made, the process screen 26 and document window 24 are displayed.

CRF Processing, DCFs and Tags

Figure 2:
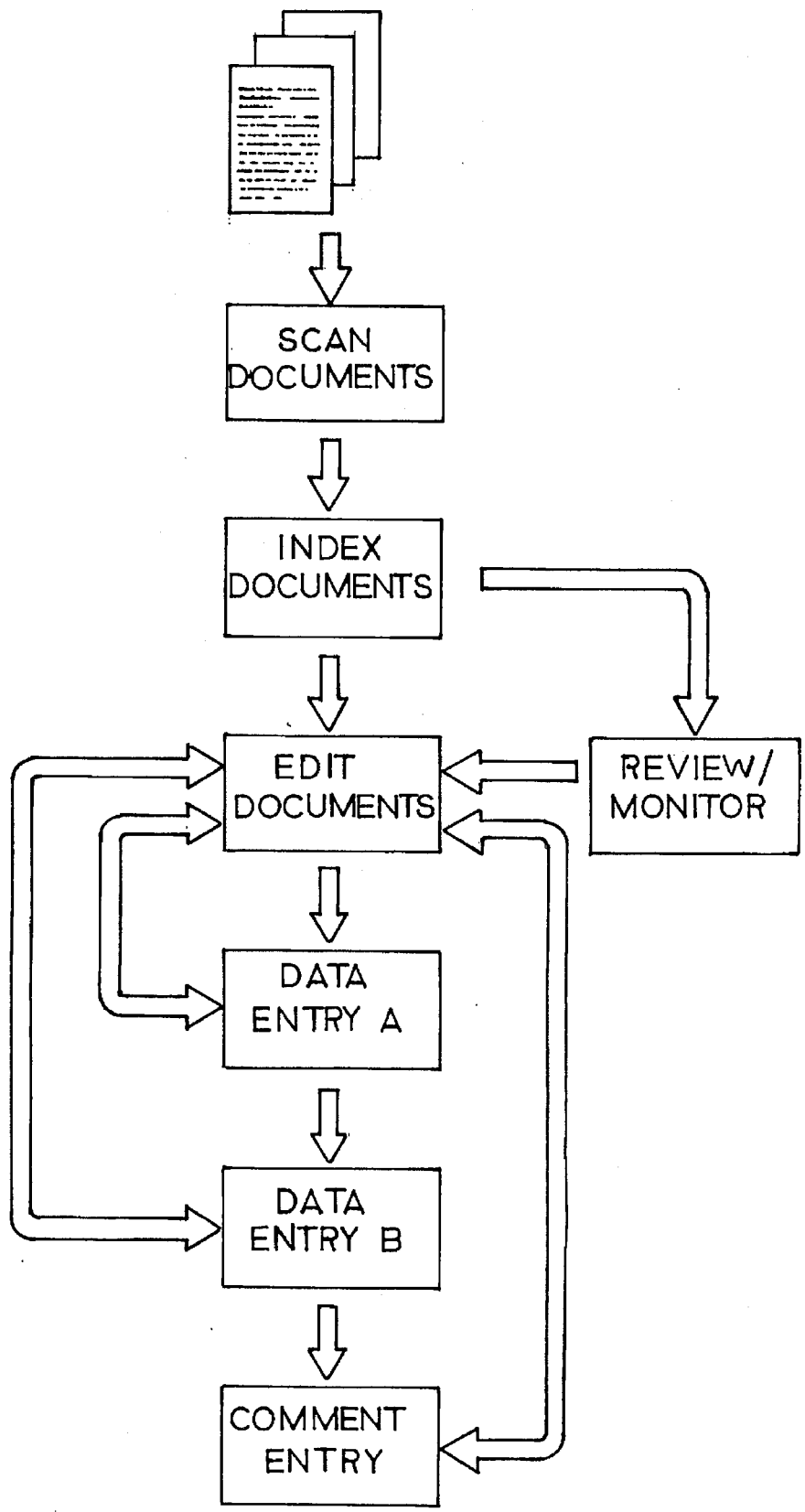
FIG. 2 is a flow diagram illustrating the major processes in the document management system.

The major processes in a typical protocol include: (1) document scanning; (2) document indexing; (3) monitoring review; (4) editing; (5) data entry; and (6) comment entry. These processes and the general flow are illustrated in FIG. 2.

The initial step in the process is document scanning. Each CRF is scanned and digitized into a digital format. After scanning, each page of the document is indexed to enable document tracking and routing. The document is then electronically distributed to system users involved in data processing. Each page scanned is routed according to predefined routing schemes based on the index information. Typically, each page will be routed to a scientific data editor who edits the document and then to a data entry operator. The data entry operator enters data on the CRF page into the scientific database. The data is double-keyed. That is, the data is entered into the database by two different entry operators. The data entered by each operator is compared and, if the data matches, it is accepted into the database. If not, the data is rejected until the discrepancy is resolved.

In some protocols, certain pages of a CFR may need to be reviewed by a monitor prior to editing and data entry. In such cases, a separate routing scheme can be designated for those pages only. The pages requiring review by a monitor are first routed to the monitor. After the review is complete, the page is sent to data editing and is processed in the normal manner.

During data entry, certain questions might arise concerning the document. If the data entry operator is unsure about the data, the document can be routed back to the scientific data editor for clarification. If the scientific data editor can resolve the question, it is sent to the next user in the workflow scheme. For example, if the data entry A operator encounters a problem and routes the document back to the scientific data editor and the editor resolves the problem, the document will then be routed to data entry B. If the document returns to the scientific data editor from data entry B, it is routed to comment entry after the problem is resolved.

In some cases, questions concerning the data cannot be resolved by the scientific data editor. In such cases, the scientific data editor generates a TAG. A TAG is a record of problems associated with a particular CRF page. All TAGs records are stored in a separate TAGs database. A separate TAGs program is used to generate and process TAGs records. The TAGs program is used to update or modify entries in the main database or to generate data clarification forms (DCFs).

When a question concerning the data is encountered that cannot be resolved by the scientific data editor, a DCF is generated and sent to the investigator associated with the particular CRF. An entry is also made in the TAGs database, and the DCF is associated with the TAG. When the DCF is returned by the investigator, the information is entered into the TAGs database. The TAGs database is then used to update the data in the main database.

Workflow Queues

Users of the SDM system are divided into workgroups. The workgroups are defined by the system administrator. Each workgroup is assigned specific functions. For example, in the process described herein, the following groups and functions are used:

| GROUP | FUNCTIONS |
| --- | --- |
| Clinical Documents | Document Scanning |
|  | Document Indexing A |
|  | Document Indexing B |
| Scientific Data Editing | Editing |
|  | Editing Review |
| Data Entry | Data Entry A |
|  | Data Entry B |

Each of the functions is described below.

Workflow queues are used for distributing work to users and for selecting workflow items requiring an action. Each major process, such as indexing, editing, data entry, and comment entry, has an associated workflow queue. Each workflow queue is assigned to a specific workgroup. Only users in the assigned workgroup can access items in a given workflow queue.

The queue functions as a container for workflow items requiring action. Access the workflow items is made via the workflow queue. The workflow queue contains a list of all active protocols which have workflow items requiring further action. Associated with each protocol is a list of document types requiring processing. Work is initiated from a workflow queue by first selecting a protocol and then selecting a specific type of item for processing. Once items are selected from a workflow queue for processing, the items are marked "In Use." An "In Use" item cannot be selected for processing by any other user until it is released. The item may, however, be selected for any "read only" process, such as ad hoc retrieval, which requires only viewing of the item.

Workflow Routing

The system allows documents to be split into components (i.e. pages) which can be individually routed through the data management system. Each item is classified by document type. Each document type is assigned to a workflow group. For each workflow group, a separate rotating scheme can be defined which details the sequence of workflow nodes and the actions to be performed at each node. A node can be a workflow queue or a particular user workstation. When a required action is performed at a workflow node, the item is routed to the next node.

The routing scheme for a particular workflow category comprises a collection of routing paths. A routing path is a link between two workflow nodes which identifies one node as the source node and the other node as the destination node. For example, in the path B→C, B is the source node and C is the destination node. After work is completed at node B, the item is routed by the workflow server to node C.

Each routing path has an associated "state" and "action" which defines the routing path context. The "state" of a workflow item indicates its current disposition while an "action" indicates the activity that is required of the destination node. After an action is completed on a workflow item at a given node, the "state" and "action" are updated to reflect the current disposition of the item and the next required action. By examining the "state" and "action" associated with each item, its location in the workflow can be determined.

The workflow server uses routing schemes and routing paths to distribute workflow items among nodes. At each node, the workflow server uses the current node ID to determine the appropriate routing path. The item is routed along that path to the next node. For example, suppose a workflow item is a given node. The node then releases the item for further processing. The workflow server routes the item from the current source node defined by the routing path to the current destination node.

When a terminal node is reached in the routing process, the item is removed from the workflow. A terminal node is the last node defined in the routing scheme which is not a source node in any defined routing path. When the workflow item reaches the terminal paths: A→B, B→C, C→D. If the routing path B→C were deleted from the routing scheme, the workflow would stop at node B because there is no path from B to any other node. This would result in CRF pages being inadvertently dropped from the workflow.

II. Protocol Setup

Before documents can be processed, certain information must be entered by a system administrator to set-up the protocol. To start a new protocol, the following steps must be performed:

1. Add protocol summary information.
2. Define index and tracking fields for protocol.
3. Define content and structure of CRF packet.
4. Define investigator names, IDs, and patient assignments.
5. Assign users to the protocol and define access rights of users.
6. Define routing schemes for each document type in protocol.

The step of defining the protocol involves entering summary information about the protocol into the database. The summary information will typically include a protocol identifier, a description of the protocol, the start date of the protocol, the end date of the protocol, the priority level, and priority date. The total number of pages expected to be received is calculated based on the CRF packet definition and patient information.

As previously described, the data management system internally tracks each document that is scanned and indexed. The index and tracking information may be different for each protocol. Since the indexing fields may differ from one protocol to another, each protocol has its own table within the database. A system administrator defines protocol specific index and tracking fields during the protocol definition process. The index fields and tracking table must be defined for each protocol before any documents for that protocol can be processed.

In order to define the indexing/tracking table for a new protocol, the following information is required:

1. the protocol name;
2. the protocol tracking table's name;
3. the table space name;
4. the tracking table size; and
5. the tracking table's fields and their attributes.

The protocol name is entered by the system administrator during protocol setup. The tracking table name, table-space name, and tracking table size are internally assigned by the database management system. The field information is selected by the system administrator. The field information includes the field name, field label, field data type, field size, a logical field indicating whether the field is a key field, the field order, a logical field indicating whether the field is indexed, and a logical field indicating whether the field contains unique values.

After completion of the field definition process for a protocol's indexing/tracking table, the database management system automatically generates the indexing/tracking table and its indexes. After the index/tracking table is built, the system will accept CRFs for this protocol.

The indexing fields used in a given protocol will include certain system-defined fields, and may include one or more user-defined fields. The system-defined fields are default fields used in every protocol. Some system-defined fields are modifiable, others are not. The system-defined fields are shown in Table 1 below:

| FIELD NO. | FIELD NAME | MODIFIABLE | EXAMPLE |
| --- | --- | --- | --- |
| 1 | Doc_Type | NO | C |
| 2 | Protocol | NO | 0123 |
| 3 | Rcvd Date | NO | 05/23/93 |
| 4 | Version | NO | 1 |
| 5 | Repeat | NO | 1 |
| 6 | Continuation | NO | 1 |

-continued

| FIELD NO. | FIELD NAME | MODIFIABLE | EXAMPLE |
|---|---|---|---|
| 7 | Multi-Page | NO | 1 |
| 8 | Investigator | YES | Dr. John Doe |
| 9 | Patient | Yes | John Doe |
| 10 | Visit | YES | 1 |
| 11 | Page Type | YES | AE |
| 12 | Number of Pages | YES | 25 |
| 13 | Comment | YES | This is a comment |

The user-defined fields are undefined fields which can be used by the system administrator to customize the index information for each protocol. The user defined index fields are defined during protocol set up.

The third step in the protocol set up involves CRF packet definition. The CRF packet definition identifies all of the pages expected to be received for a particular protocol. As pages arrive and are scanned into the system, the index process will verify each page against the CRF packet layout, and determine if the page received is one that is expected.

During CRF packet definition, information is entered into the database regarding the CRF pages expected for each patient visit. This information includes the visit number, the CRF page type, the file corresponding to the CRF page being described, the data-entry sequence for the file, the panel in the database that the file is associated with, and the number of pages the file contains. The CRF packet information is used to verify pages which are received for each protocol. After each page of a document is scanned, the index process compares the index information against the CRF packet definition to determine if the page received is a valid page. If the index information for a document is invalid, the system will reject the document and notify the user.

After the CRF packet is defined, the next step in the protocol setup process is to define the investigator/patient information. The name and identification number for each investigator is entered into the database. The beginning and ending identification number for patients assigned to each investigator is also entered. This information is used to provide valid entries for indexing and tracking fields.

During setup, users are assigned to each protocol. Only users assigned to a specific protocol may access documents associated with that protocol. For each protocol, a user identification is entered for each user which has access to that protocol.

The last step in the protocol setup process is to associate a routing scheme for each document type. The routing scheme defines how workflow items are distributed. Once defined, the system automatically routes and distributes workflow items based on the routing scheme.

III. Process Functions

Document Scanning

Document scanning is the process in which paper documents are scanned and converted into an electrical format. Documents are normally scanned when they are received. The scanned documents are assigned to a batch. Each batch has a unique batch number for internal tracking purposes.

The scan function is selected from a main menu (not shown). When the scan function is selected, the dialog box similar to the one shown in FIG. 4 appears. To initiate document scanning, the scan operator either creates a new scan batch by selecting the new function in the batch scan dialog box, or selects an existing batch. To create a new scan batch, the scan operator enters a batch name, the protocol to which the batch is assigned, and the receipt date.

Once a batch is opened, the document window 24 and scan control screen appear the document window.

The document manager maintains the scanned pages in proper sequence. When scanning double-sided page, the scan operator first scans the front side of each page and then scans the back side. The document manager automatically assembles the pages in the proper order.

The scan operator has the responsibility of reviewing each batch scanned to make sure that the images are legible, properly oriented, and in proper sequence. This review can be made interactively with the scanning process. Alternately, the review process can be done after all documents in a given batch are scanned. The operator can reject or rescan any image which is not legible. If the image is rejected, it is simply deleted from the scan batch. The rejected image may then be included in a subsequent batch. The quality control procedures at the end of the process assures that there are no missing pages. If the image is rescanned, it replaces the previously scanned image.

Document Indexing

Document indexing is the process of associating identifying information with each image. The index information is used to track "active" images in the workflow during processing. Thus, the location of the image can be determined as it moves through the workflow process. Index information is also used to retrieve stored images.

The index information comprises a series of system-defined and user-defined index fields. As already discussed, these fields are defined during protocol set-up by the system administrator. The user-defined fields enable the system administrator to tailor the index information for a given protocol.

Double entry keying of document index information can be used to insure the accuracy of the index information. The documents are first indexed through a batch index process and then routed to an index validation queue where the index information is validated.

To initiate indexing, a batch is selected using the scan batch dialog box shown in FIG. 4. After a batch is selected by the indexer, an index process screen similar to the one shown in FIG. 6 is displayed. The index process screen displays specific index fields defined during set-up for the corresponding protocol. The protocol and received data fields are automatically filled in based on data entered by the scan operator at scan time. All pages in the selected batch are made available to the indexer and the first page of the batch is displayed in the document window 24. The indexer enters index values in each of the index fields defined during protocol setup.

For some fields, the number of valid entries may be limited. In such cases, pull-down lists containing the legal values for the field may be used. The use of pull-down fields helps insure the quality of the indexing processing. After selecting, entering and confirming index values for the current image, the operator may then save the index fields. If no duplicate index information is detected, the system will record the index information and display the next image in the batch. If duplicate information is detected, duplicate page processing will occur.

There are several circumstances which may create duplicate pages. First, the index information may be incorrectly entered. This problem is resolved by simply correcting the index information. A duplicate page may also occur if the page is an exact copy of the previous page, the page is an updated version of the previous page, the page is a continuation of a previous page, or the page is a repeat of a previous page. If the page is an exact copy of a previous page (e.g. faxed and an original version), or if the page is an updated version of a previous page but does not supersede the previous version, the page is identified as a copy or superseded version by assigning a version number to the page. If the page is an updated version that supersedes a previous page, it is routed to an exception queue for special handling. If the page is a continuation of a previous page (e.g. two pages listing medications when only one is provided), the page is assigned a continuation number. A continuation page constitutes a separate workflow item and will follow its own patch through the SDM system.

When the index information for a particular page is saved during batch indexing, that page will continue in the workflow. All other pages will remain in the batch until they are indexed.

In protocols where index information is double-keyed, each page is routed to an index validation queue after batch indexing. When the second index operator selects pages from the index validation queue for processing, an index screen similar to the one shown in FIG. 6 appears. The second index operator re-enters index information for the same pages. As the second indexer completes the entry of the index information, the system compares the second entry with the first entry. If any discrepancy exists, the problem must be resolved before the item can continue in the workflow.

Data Editing

After indexing, workflow items are routed to the edit work queue for processing. The workflow items are typically either a new CRF or a DCF. Also, CRF pages may be routed back to the edit work queue by a data entry operator or comment entry operator.

The functions performed by the data editor include processing new CRFs, processing DCFs, and reviewing data entries and comment entries. New CRFs are normally routed to the data editor after indexing. In some cases, new CRFs are routed to the edit work queue by clinical operations or medical review.

The edit process screen shown in FIG. 7 is displayed when the edit operator selects items from the edit work queue for processing. The CRF page being edited is displayed in the document window 24. The edit operator reviews the CRF page for completeness and clarity. If necessary, clarification annotations are added to the document. For example, if the dosage of a medication is expressed in grams but is supposed to be expressed in milligrams, a clarification annotation is created to place the entry into the proper units. If an ambiguity in the document exists which cannot be resolved by the data editor, the data editor creates a DCF using the screen shown in FIG. 8. The DCF is sent back to the investigator. The process for creating new DCFs is described below.

The edit operator is also responsible for reviewing "hot keys" which are generated during data entry. A "hot key" is a flag which is inserted by the data entry operator to mark any problems encountered by the data entry operator. Normally, the data entry operator will make a data entry in the given field, mark the entry as questionable, and return the CRF page to the edit operator for review. The edit operator reviews the "hot key" inserted by the data entry operator. If the data editor is able to resolve the problem, the data editor either accepts the entry made by the data entry operator or changes the entry. The page is then routed to the next node in the routing scheme. If the data editor is unable to resolve the problem, the data editor creates a new DCF using the TAGs program.

The data editor is also responsible for reviewing questions which arise during comment entry. After comment entry, certain CRF pages may be routed back to the edit work queue for review. The data editor reviews issues discovered during comment entry. At the completion of the review by the data editor, the page is routed back to comment entry for completion or to an SDA coordinator.

The data editor is also responsible for processing DCFs. DCFs, or data clarification forms, are sent to protocol investigators to clarify data entries made on CRFs. DCFs are used to update information stored in the database. There are two types of DCFs—clinical DCFs and approved DCFs. Approved DCFs are generated internally during data processing and have an entry in the TAGs database. Clinical DCFs originate externally and therefore do not have a corresponding entry in the TAGs database.

The TAGs program is used to enter DCF information and to update the clinical database. Alternately, the clinical database can be updated manually. If the TAGs program is used, the document ID for the DCF is stored with the TAGs record so that all TAGs associated with a CRF are known. In addition, the DCF ID and an annotation ID can be associated with each TAGs record and a TAG ID can be associated with an annotation. In the later two cases, a "duplicate" function is provided to generate multiple electronic copies of the clinical DCF. Each duplicate copy is entered into the TAGs database using the method described above.

Data Entry

Edited documents are routed to the data entry work queue for entry into the database. All data is double-keyed. That is, the data is entered by two different data-entry operators, referred to herein as data-entry A operator and data-entry B operator. A separate workflow queue is maintained for data-entry A and data-entry B operations.

Documents are routed from the edit operator to the data-entry A work queue. The data-entry A operator selects items to be processed from the corresponding work queue. Before selecting items for processing, the data entry operator must log-on to the appropriate database for the protocol. When a set of pages is removed from the work queue, the data entry process screen shown in FIG. 9 is displayed. The system sends a key stroke sequence to the relational database management software that opens the entry screen associated with the first CRF page that has not been previously entered. The data-entry operator enters the data. A predefined keystroke sequence is used to commit the data. When the data is committed, the predefined keystroke sequence is trapped and the next page is displayed to the data-entry operator. The previous page is then routed to the data-entry B operator.

The data-entry B operator verifies the data entered by the data-entry A operator. The system prevents the same data entry operator from performing both data entry A and data entry B on the same document. Thus, when a data entry operator performs data entry A, that operator cannot select the document for data entry B. The data-entry B operator calls records entered into the database by the data-entry A operator. After entering the information for each field, the next record is automatically called.

The SDM system interacts with the database at a "document" level. A document comprises one or more CRF pages with the same document I.D. For example, a multi-page file will have one document I.D. The operator uses the keyboard to navigate through the pages within the document. When the multi-page document is committed, all CRF pages with the same document I.D. are marked as completed.

Maintaining document synchronization between the SDM system and the database is necessary to insure that the correct data-entry panel is displayed, and that the navigational keys are correctly interpreted. It is also important to know which document relates to each record entered into the database. It may be necessary to retrieve the document at some subsequent time to review the data. Associating documents with its corresponding data set is also necessary for accurate DCF association. Because index information and header information in the database are keyed and maintained separately, there is a risk for discrepancy occurring.

To resolve these problems, the SDM system automatically links each database record with a CRF image. The link is made by automatically populating a predetermined field in each database record for each CRF file. This field is used to identify the source image for each database record. Each data entry form includes a DOC-ID field which is used to associate the data record with an image. The DOC-ID field cannot be modified by the data entry operator. Each time a new page is displayed, the DOC-ID field is automatically filled-in using the index information previously entered which uniquely identifies each image. The DOC-ID field provides a permanent, uneditable link between each data record and its source image.

Comment Entry

After data entry, all documents are routed to the comment entry work queue. The documents reach the common entry work queue after data entry B or, if there are "hot keys" to resolve, after the edit review of the data entry B operation.

The comment entry operator selects an item from the comment entry work queue for processing. After selecting items for processing, a process screen similar to the one shown in FIG. 10 is displayed. The image are displayed in the document window 24. The process screen 26 allows the comment entry operator to enter comments. After any comments are entered, the comments are saved in a separate comment database. Each entry in the comment database will include a document I.D. field which associates the entry in the comment database with a corresponding image. Preferably, the document I.D. field in the comment database will be automatically filled in as each image is displayed in the document window 24.

If there are any questions about the image, the comment entry operator may route the image back to the editing operator for further review. Otherwise, the processing on the item is complete and the item is dropped from the workflow.

The electronic document management system of the present invention has significant advantages over manual processes. First, the electronic document managing system eliminates the need for handling paper documents after the documents have been scanned and converted to electronic images. Thus the electronic document management system substantially reduces the chances that documents may be lost or misplaced.

Another advantage of the electronic document managing system is that the efficiency of the data entry operation is substantially increased. The data management system eliminates the need for making paper files or books containing documents to be processed. A separate image can be made of each page and each image can be routed independently of all other images. By independently routing each image when work on that image is complete, the bottlenecks associated with handling paper files is eliminated. Also, the document management system eliminates the time consuming process of organizing documents into files or books.

What is claimed is:

1. A method of handling, routing, and electronically managing clinical trial data contained in clinical case report forms in a computer network having a plurality of work nodes interconnected by a communications media, said method comprising the steps of:

(a) establishing a network of at least two work nodes for processing said case report forms, wherein one of the work nodes is a data entry work node;

(b) subdividing each clinical case report form into two or more subdivisions;

(c) assigning a subdivision type to each subdivision of said case form report;

(d) for each subdivision type defining a routing scheme through the network of work nodes which defines a sequence of nodes followed by that subdivision as it moves through the network of work nodes wherein each routing scheme includes at least one data entry node;

(e) storing the routing scheme for each subdivision in a computer connected to said network for, subsequent use in routing images through said network;

(f) after the case report form has been subdivided, scanning each subdivision and creating an electronic source image which corresponds to each subdivision of the case report form;

(g) indexing each image by assigning indexing information to the image that uniquely identifies each image wherein the index information includes the subdivision type of the corresponding subdivision;

(h) independently routing each image through the network in accordance with the routing scheme for its subdivision type, wherein at each work node along the routing scheme some action is performed on that image before it advances to a succeeding work node;

(i) at the data entry work node, entering data contained in the image into a database to create a database record;

(j) associating each record in the database with the source image that contains the data by linking a database record to its source image by assigning an identification to each image created that uniquely identifies the image and automatically storing the image identification in the database;

(k) establishing a protocol corresponding to a pharmaceutical clinical trial study that implements case report forms and defining a case report form packet for the protocol that describes each case report form page that is expected in connection with the protocol; and (l) wherein the protocol includes the step of providing protocol summary information defining indexing and tracking fields for the protocol, defining content and structure of the case report form packet, defining investigator names and patient assignments, assigning users to the protocol and defining access rights of the users, and defining routing schemes for each subdivision type of the protocol.

2. The method of claim 1 wherein the step of indexing said images includes defining index fields for storing said index information, and entering said index information into its corresponding index fields.

3. The method of claim 2 wherein said index fields include permanent index fields which are system defined and which are non-modifiable by a user, and user-defined index fields which are defined by the user and are modifiable.

4. The method of claim 1 further including the step of validating case report forms by using the case report form packet.

5. The method of claim 1 wherein the step of defining a case report form packet includes describing a complete set of case report form pages used for a single patient over the course of the clinical trial study.

6. The method of claim 1 wherein the step of routing a certain image through the network includes routing the image to an editing work node for editing the data associated with that image.

7. The method of claim 6 wherein a certain routing scheme includes double data entry work nodes and wherein the data of a certain source image is entered into the data base record twice, once each by two different data entry operators.

8. The method of claim 7 including the step of routing certain source images to a monitoring station for review by a monitor prior to the source image being routed to editing and data entry work nodes.

9. The method of claim 8 wherein certain routing schemes include a comment work node and wherein the method includes routing certain images to the comment work node after the image has been routed to indexing and editing work nodes.

10. The method of claim 9 including the step of generating a separate database for storing questionable data, associated with certain images, that cannot be resolved at an editing work node.

11. The method of claim 10 including the step of generating a data clarification form (DCF) in cases where questions arise with respect to selected data found in a certain image, and thereafter directing that DCF form to an investigator associated with the particular clinical case report form that includes the questioned data.

12. The method of claim 10 wherein the computer and computer network that carry out the present method form a part of a data management system that includes a workflow server and wherein the method includes the step of the workflow server utilizing the defined routing schemes to direct workflow items among the various work nodes of the network.

13. The method of claim 1 wherein the computer and computer network form a part of a data management system and wherein the method further includes the data management system tracking each indexed subdivided source image as the image moves along a defined routing scheme and through the various work nodes of the routing scheme.

14. The method of claim 1 including the step of defining indexing fields and a tracking table for a particular protocol before processing the clinical case report forms.

15. The method of claim 1 wherein the step of defining a case report form packet includes identifying each subdivision type for a particular protocol such that the case report form packet can be used to verify subdivision types which are received for each protocol.

16. A computer implemented method for handling and processing clinical case report forms comprising the steps of:

(a) establishing a protocol for a particular pharmaceutical clinical trial study and implementing a clinical case report form for carrying out the established protocol;

(b) defining subdivisions of the clinical case report form and embodying these defined subdivisions in a case report form packet that describes the subdivisions of the clinical case report form;

(c) establishing a network of a series of work nodes for processing the clinical case report form wherein the series of network nodes includes a document scanning node, a document indexing node, and a data entry node;

(d) subdividing the clinical case report form into a plurality of subdivision;

(e) assigning a subdivision type to each subdivision of the clinical case report form;

(f) defining a routing scheme through the established networks nodes for each subdivision type of the clinical case report form which dictates a sequence of network work nodes to be followed by each subdivision type as that subdivision type moves through the network of work nodes and wherein each defined routing scheme includes a document scanning node, a document index node, and a data entry node;

(g) storing the routing scheme for each subdivision type in a computer that forms a part of a data management system and wherein the computer is communicatively connected to said network for subsequent use in routing images through the network;

(h) scanning the respective clinical case report forms into the computer and creating an electronic source image for each subdivision of the clinical case report form;

(i) the document management system, including a work flow server and wherein the method includes the step of the work flow server directing the various electronic source images to the various work nodes of the network in accordance with the defined routing schemes stored in the computer for the various subdivision types of the clinical case report form;

(j) indexing each electronic source image at a document indexing work node by assigning indexing information to the image that uniquely identifies each image wherein the index information includes the subdivision type of the corresponding subdivision of the clinical case report form;

(k) routing each image to an editing work node and editing the data associated with that image;

routing the respective images to a data entry work node and entering data contained in the images into a database to create a database record, (m) independently routing each electronic source image through the network in accordance with the routing scheme for its subdivision type wherein at each work node along the routing scheme some action is performed with respect to that image before it advances to a succeeding work node, and (n) the data management system tracking each indexed subdivided source image as the image moves along the defined routing scheme and through the various work nodes of the defined routing scheme.

* * * * *